Fig. 1.

INVENTOR.
Richard W. Treharne Jr.
BY
HIS ATTORNEY

July 3, 1956  R. W. TREHARNE, JR  2,753,550
VEHICLE REPORTING SYSTEMS
Filed March 3, 1951  4 Sheets-Sheet 4

INVENTOR.
Richard W. Treharne Jr.
BY
HIS ATTORNEY

United States Patent Office 2,753,550
Patented July 3, 1956

2,753,550
VEHICLE REPORTING SYSTEMS

Richard W. Treharne, Jr., Pittsburgh, Pa., assignor to Westinghouse Air Brake Company, a corporation of Pennsylvania Application March 3, 1951, Serial No. 213,776

20 Claims. (Cl. 340—312)

My invention relates to vehicle reporting systems, and more particularly to systems for indicating the destination, origin, or class of vehicles moving along a route.

In many places passenger vehicles scheduled for different destinations use the same route for a portion of their routes and each may stop at stations along this common route to discharge and take on passengers. Confusion and uncertainty are avoided if at each of these stations the destination and class of each vehicle is announced or indicated at the station prior to the arrival of the vehicle. Also, on subways and similar railways where the trains are operated closely following each other, delays may occur at junction points and interlockings because the wayside operator whose duty it is to arrange the track switches at such locations must wait to make sure of the destination of an approaching train before he sets up the route for the train.

Furthermore, there are places where operation is improved if a train can set into action means which will automatically establish the route for the train as it approaches a junction point.

Accordingly, an object of my invention is the provision of improved vehicle reporting apparatus to indicate at a station the destination or class of a vehicle approaching this station.

Another object of my invention is the provision of vehicle reporting systems incorporating novel means capable of responding differently for each of a plurality of different control influences transferred between a vehicle-carried element and wayside elements.

Still another object of my invention is the provision of vehicle reporting apparatus of the type here involved incorporating novel means for transmitting signaling influences between a vehicle-carried circuit tuned to resonance at a frequency selected according to the destination or class of the vehicle and a corresponding one of a plurality of wayside circuits tuned each to resonance at the frequency corresponding to the frequency of an individual one of the different destinations or vehicle classes. As an alternative arrangement the vehicle destination may be identified by a code group of two or more vehicle tuned circuits and a corresponding code group in the tuned wayside circuits.

A further object of my invention is the provision of vehicle reporting apparatus of the type here involved incorporating means for distinguishing between the signaling influence of the vehicle-carried tuned circuit on the wayside apparatus, and the influence of metal bodies such as the sides of the vehicle, on the wayside apparatus, so that the wayside apparatus responds with a much higher degree of selectivity to the influence of a vehicle-carried circuit.

The advantage of this arrangement is that it enables the coupling between the vehicle-carried circuit and the wayside circuit to be materially reduced, either by increasing the maximum distance between them or by reducing their dimensions, or both.

Still another object of my invention is the provision of vehicle reporting apparatus of the type here involved which may employ either electromagnetic or electrostatic coupling means for coupling the wayside equipment to the tuned circuit on the vehicle.

A further object of my invention is to provide a vehicle reporting system of the type here involved which incorporates means for reducing the normal coupling between the wayside transmitting and receiving elements, either by suitable locations of the wayside elements, by introduction of balancing voltages at appropriate points in the apparatus, or by proper spacing of the wayside elements.

Other features, objects and advantages of my invention will appear as the specification progresses.

The systems shown herein are improvements upon those described and claimed in my prior application Serial No. 105,144, filed on July 16, 1949, now Patent No. 2,673,292.

To attain the foregoing objects, features and advantages of my invention, I provide, at a reporting point or a station along a route over which vehicles operate, a pair of electrical impedance elements, disposed to be influenced by a corresponding element located on a vehicle which passes the location. A plurality of oscillators are connected in multiple to one of the two impedance elements, each oscillator supplying energy of a particular frequency. As an alternative to providing a plurality of different oscillators, I may provide a single oscillator to supply energy having a wave form which is made up of a plurality of different frequency components, or a single oscillator arranged so that its frequency is recurrently changed. The number of oscillators provided is such that there is a selected oscillator or a selected group of oscillators for each destination or class of vehicle operating over this route. In other words, the energy supplied to the transmitting wayside element has a selected frequency component for each vehicle destination or class or a selected group of frequency components for each vehicle destination or class.

I also provide at this reporting point a plurality of receivers or tuned circuits coupled to the other of the two wayside impedance elements, one for each frequency component of the energy supplied to the first impedance element by the oscillators. Each of the receivers preferably includes a tuned amplifier, a controlled ionization or gas tube, and a relay interposed in the anode circuit of the gas tube. The arrangement is such that each tube is non-conductive as long as no voltage is supplied from the output of the amplifier of the receiver. When a voltage of the correct frequency is supplied to the receiver, it is amplified by the tuned amplifier and the gas tube is fired so that the corresponding relay is energized by the conduction current of the tube. Consequently the relays associated with the receivers are selectively energized singly or in groups according to the frequencies of the voltages supplied to the inputs of the several receivers.

Each vehicle is equipped with at least one impedance element tuned to resonance at a frequency corresponding to the destination and class of the vehicle. As an alternative arrangement each vehicle may be equipped with a group of impedance elements and circuits and each destination or class identified by a selected combination of two or more frequencies. The passage of a tuned vehicle impedance element near the wayside elements causes the energy supplied by the oscillators to be transferred from the transmitting wayside element to the receiving wayside element at the frequency for which the vehicle equipment is tuned, and in such manner that energy of other frequencies is not transferred. This action causes a voltage having the frequency at which the vehicle element is tuned to appear across the input terminals of the appropriate receiver, and as a result the gas tube of the receiver is fired to energize the respective relay. These relays are used in turn to control circuits which govern destination and other indicating devices at a wayside station or interlocking tower, or may be used for governing the switches which will be operated to set up a route in accordance with the destination of the vehicle. Either automatic or manual means for subsequently deionizing the gas tube that has been fired due to the passage of a vehicle may be provided. When each destination is identified by a code combination of frequencies, then the destination indicators will be selectively controlled by a corresponding group of relays of the tuned receivers.

It has been found that when the apparatus is adjusted to a high degree of sensitivity to permit operation with a comparatively large space between the wayside impedance elements and the vehicle-carried impedance elements, erroneous operation may be caused by the passage of large metallic objects near the wayside elements, such as the metal sides or floor of a passing vehicle. This action is a result of eddy currents induced in the metal by the electromagnetic field created by the wayside element which is coupled to the oscillators. It will be obvious that the energy thus transferred will contain all the frequency components which are supplied to the transmitting element, so that each of the tuned receivers coupled to the wayside receiving element may be actuated. In a preferred embodiment of my invention, I provide means for comparing the phase of the output voltage of the receiving wayside element or the output voltage of the tuned amplifiers with the input voltage to the transmitting wayside element to detect the direction of the phase shift between the two voltages. If the phase shift is such that it shows the unbalance has been produced by a metal object influencing the wayside equipment, the gas tube previously described is prevented from firing and the relay controlled thereby remains released, but if the phase shift is such that the voltage supplied to the tuned amplifier is the result of a tuned vehicle element influencing the wayside elements, the gas tube is fired and the relay operates to indicate the passage of the vehicle.

I shall describe several forms of vehicle reporting apparatus embodying my invention and shall then point out the novel features thereof in claims.

In the accompanying drawings.

It is to be understood that my invention is not limited in its use to systems for indicating the destination of railway trains but it may also be applied to highway vehicles such as buses. This one application of the apparatus serves as an illustration of the principles of the invention and other applications of the apparatus will suggest themselves to those skilled in the art.

In each of the several views, like reference characters are used to indicate like elements.

Figure 1:
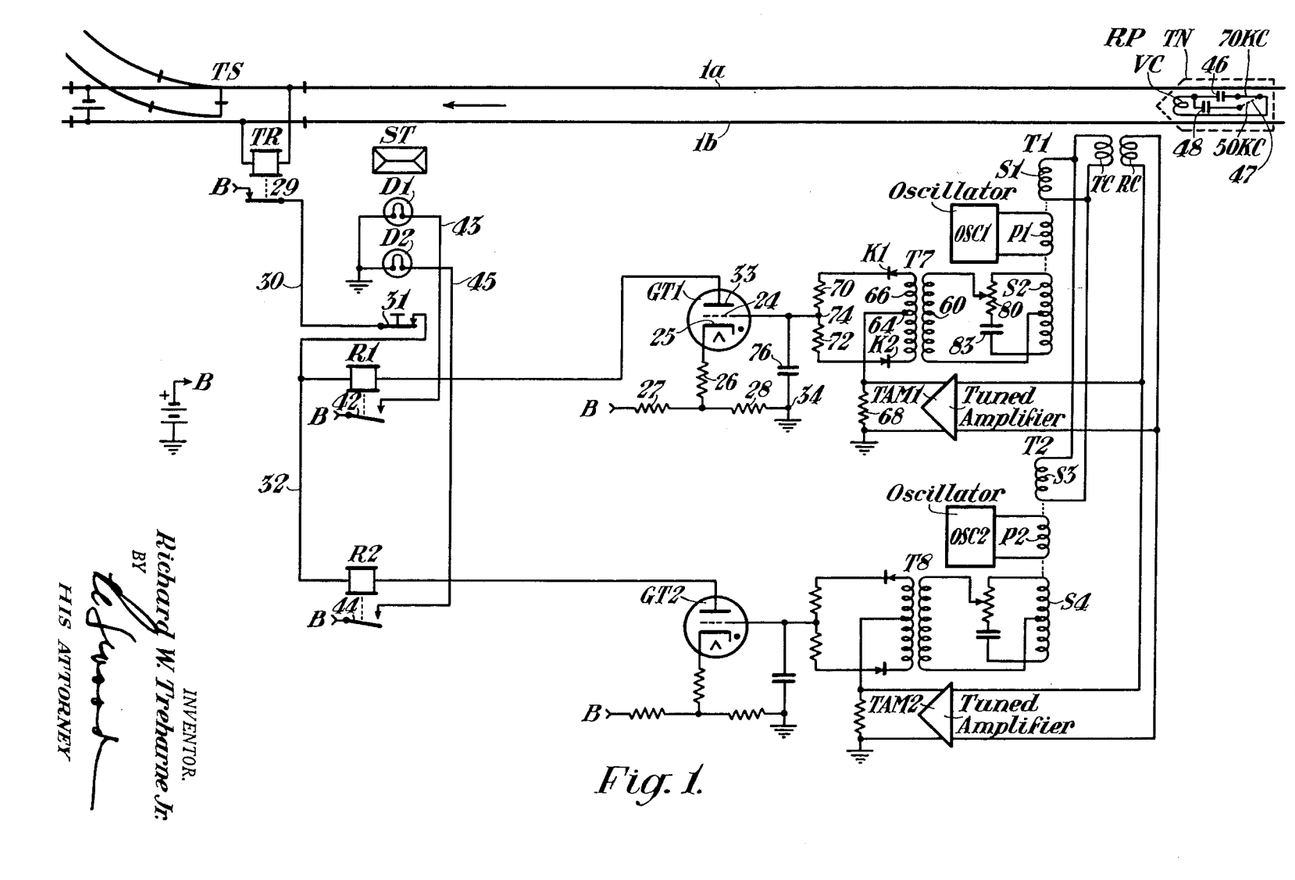
Fig. 1 is a diagrammatic view showing a preferred form of vehicle reporting apparatus embodying my invention as used to indicate the destination of a railway train.

Referring to Fig. 1, the reference characters 1a and 1b designate the track rails of a stretch of railway over which trains such as the one designated by the reference character TN in the drawing normally operate in the direction from right to left as indicated by the arrow in the track. Trains operating over this stretch of railway may stop at a station ST to discharge or take on passengers, the train then proceeding to the left as viewed in Fig. 1 to either a first destination when a track switch TS is in its normal position as shown in Fig. 1 or to a second destination when the track switch TS is in its reversed position. The track switch TS may be hand operated or it may be operated by a power switch machine which is either controlled manually by an operator located nearby or at some remote point, or may be controlled automatically in accordance with the destination indicated by the apparatus of my invention. The apparatus for operating the track switch TS is not shown since this forms no part of my present invention.

A reporting point RP is established along the railway at a selected point in approach to the wayside station ST, and the trackway apparatus of the vehicle reporting system embodying my invention is located at this point, the distance between the station ST and the reporting point RP being determined according to the nature of the track and the speed at which the trains travel this stretch of the railway. The wayside apparatus comprises as essential elements a transmitting element, here shown in the form of a wayside coil TC, a receiving element, here shown as a wayside coil RC, at least two oscillators such as OSC1 and OSC2, and at least two receiving circuits each of which includes a tuned amplifier, a controlled ionization or gas tube, a relay, and phase discriminator means.

The wayside transmitting and receiving coils TC and RC are preferably air core coils consisting of one or more turns of wire as may be selected. The coils are made of suitable size and are preferably housed in a case to protect them against mechanical injury, the case being constructed of material such that the electrical characteristics of the coils are not affected. The coils TC and RC are mounted near the track, in such manner that a similar coil mounted on a passing vehicle will be relatively close to the wayside coils but sufficient clearance will be allowed outside of the prescribed clearance line which defines the maximum space occupied by the vehicles. Several suitable mounting arrangements will be subsequently described.

The oscillators OSC1 and OSC2 of the wayside apparatus at the reporting point RP are shown conventionally since they may be any one of several well-known forms. Preferably these oscillators are of an electron tube type each supplying a preselected individual frequency which is maintained relatively constant. The frequencies of the oscillators may be selected from a relatively wide range of frequencies and I have found that the frequencies in the range from one kilocycle to one megacycle is satisfactory, and by way of example, the frequencies of the oscillators OSC1 and OSC2 will be assumed as being 70 kc. and 50 kc., respectively.

The output of the oscillator OSC1 is connected to a primary winding P1 of a transformer T1. Similarly, the output of the oscillator OSC2 is connected to primary winding P2 of a transformer T2. Secondary winding S1 of transformer T1 and S3 of transformer T2 are connected in multiple to the transmitting coil TC, so that energy of the two frequencies, that is, the 70 kc. of oscillator OSC1 and the 50 kc. of oscillator OSC2, are simultaneously supplied to the transmitting coil TC.

A receiver for each of the frequencies employed at the reporting point RP is provided, each receiver including a tuned amplifier, a discriminator circuit provided with a phase shifting circuit for supplying a reference voltage thereto, a controlled ionization or gas tube, and a relay. The amplifiers such as tuned amplifier TAM1 and tuned amplifier TAM2 are shown in a conventional manner since they may be of any standard arrangement for electron tube amplifiers having tuned input and output circuits, so that they respond to a single predetermined frequency. The input circuits of the two amplifiers TAM1 and TAM2 are connected in multiple to the receiving coil RC. Amplifier TAM1 is tuned to resonance at the frequency of 70 kc., and amplifier TAM2 is tuned to resonance at 50 kc., so that the output of these amplifiers depends upon the frequency of the input energy supplied from the receiving coil RC.

Since the receiving apparatus is identical for each frequency with the exception of the tunning and the other adjustments in the circuit, it is believed that a detailed description of the apparatus associated with the tuned amplifier TAM1, for receiving the 70 kc. energy will suffice to describe the operation of both the sets of receiving apparatus.

The output of the tuned amplifier TAM1 is impressed across a resistor 68, which has one end connected to ground, and the other end connected to a mid tap 64 of the secondary winding 66 of the discriminator transformer T7. The primary winding 60 of transformer T7 is connected to a secondary winding S2 of transformer T1 through a phase shifting circuit comprising a resistor 80 and a condenser 83 connected in series across the outer terminals of the secondary winding S2, with a variable tap on the resistor 80 connected to one terminal of the primary winding of transformer T7, and the center tap of winding S2 of transformer T1 connected to the other terminal of the primary winding 60 of transformer T7. The upper and lower terminals of secondary windings 66 are connected to half-wave rectifying elements K1 and K2, which may be of any suitable type, either a semi-conducting material, or an electron tube of the diode type. The output energy of secondary winding 66 of transformer T7 is connected through the rectifiers K1 and K2 across a pair of resistors 70 and 72, having their center points connected to ground at connection 34 through condenser 76. The gas tube GT1 is normally biased to a nonconductive condition by a suitable biasing voltage. The bias voltage source for the tube GT1 may take different forms and in Fig. 1 it is shown as a potentiometer comprising two resistors 27 and 28 connected in series across a source of power, the positive terminal of which is designated by the reference character B and the negative terminal of which source is grounded, as indicated by the battery symbol on the drawing. The cathode 25 of the tube GT1 is connected through resistor 26 to the junction terminal of resistors 27 and 28, and the low potential end of resistor 28 is connected to the junction point 34 and thereby to ground. Consequently, the cathode 25 of tube GT1 is positive in potential with respect to the grid 24 by a voltage equal to the voltage drop across resistor 28. The tube GT1 is provided with an anode circuit which can be traced from positive terminal B of the power source through front contact 29 of the track relay TR, to be referred to later, line wire 30, normally closed manually operable push button 31, line wire 32, winding of relay R1, anode 33 and tube space to cathode 25 of tube GT1, and resistors 26 and 28 to the negative terminal of the power source at the ground connection 34. The parts are so proportioned that the voltage applied across the anode 33 and cathode 25 of the tube GT1 is normally ineffective to fire the tube due to the normal negative bias provided for the grid 24. However, when positive half-cycles of rectified alternating signal voltage supplied through the discriminator transformer and rectifiers are supplied to the grid 24 of the gas tube GT1, the grid is driven sufficiently positive so that the tube GT1 is fired thus causing the relay R1 to be energized and picked up due to the conduction current of the tube.

It will be obvious from the drawing that the 50 kc. equipment including oscillator OSC2 and tuned amplifier TAM2, together with the gas tube GT2, relay R2, discriminator transformer T8, and secondary winding S4 of transformer T2, are all arranged in a manner similar to that described above for the equipment associated with the 70 kc. frequency.

The two relays R1 and R2 govern destination indicators D1 and D2 located at the wayside station ST. These indicators may be constructed to provide indications that would be distinctive and readily understood by passengers waiting at the station ST. For example, the indicators may be lamps placed back of signs giving names corresponding to the two different train destinations. For the sake of simplicity, these indicators are shown only as lamps. The lamp D1 is included in the circuit that extends from terminal B of the power source over front contact 42 of relay R1 at the reporting point, line wire 43, and lamp D1 to ground. Likewise, the lamp D2 is included in a circuit that extends from terminal B of the power source through front contact 44 of relay R2, line wire 45, and lamp D2 to ground. Accordingly, it will be seen that when either relay R1 or R2 is energized as the result of the firing of the associated gas tube, the corresponding destination indicating lamp at the station ST will be lighted to inform the passengers of the destination of the approaching train.

The train TN is provided with a controlling means in the form of a coil VC tuned to resonance at a frequency preselected according to the destination of the train. When there are two destinations either of which the train may take, as is the case in Fig. 1, the coil VC is made tunable either to a first or a second frequency. To agree with the frequencies assumed for the wayside apparatus at the reporting point RP, the coil VC is tuned to resonance at the frequency 70 kc. when the train is scheduled for the first destination and is tuned to resonance at 50 kc. when the train is scheduled for its second destination. To obtain this tuning for the coil VC the two capacitors 46 and 48 are provided on the train together with a manually operable switch 47. The arrangement is such that when the switch 47 is set at the position indicated by the solid line in Fig. 1, the capacitor 46 is connected to the coil VC and the coil is tuned to resonance at 70 kc. When the switch 47 is set at the position indicated by the dotted line in Fig. 1, the capacitor 48 is connected to the coil VC and the coil is tuned to resonance at 50 kc. The train coil VC may consist of one or more turns and is mounted on the train so that it will pass the wayside coils TC and RC in an inductive relation therewith when the train passes the reporting point RP.

The operation of the embodiment of my invention shown in Fig. 1 will now be described in detail with reference to the apparatus associated with relay R1, under different conditions.

The apparatus is shown in its normal condition, with no vehicle-carried coil in the vicinity of transmitting or receiving coils TC and RC. At this time energy from the oscillator OSC1 is supplied through transformer T1 and the phase shifting circuit to the primary winding 60 of transformer T7. This energy induces a voltage of the same frequency in the secondary winding 66 of transformer T7. During one-half cycle of the voltage in the secondary winding the polarity is such that the asymmetric devices K1 and K2 conduct the current, and during the other half-cycle the asymmetric devices conduct but little or none at all. The voltage drop around the loop formed by the secondary winding 66 of the discriminator transformer, the asymmetric devices K1 and K2, and the series resistors 70 and 72 add to zero, and, consequently, the center tap 64 of the transformer secondary winding and the junction point 74 of the resistors are at the same potential. The center tap 64 of the transformer secondary winding is connected to ground through the resistor 68, and since there is little or no current being supplied at this time from the output of amplifier TAM1, there is no voltage drop across the resistor 68, so that the center tap 64, the junction point 74 and, consequently, the grid 24 of tube GT1 are effectively grounded at this time. The cathode 25 of tube GT1 is at some positive potential with respect to ground as supplied by the voltage divider comprising resistors 27 and 28 connected between terminal B of the direct current source and ground. Accordingly, the cathode 25 of tube GT1 is at some positive potential with respect to the grid 24 of the tube, and the tube will not conduct at this time.

The transmitting coil TC and the receiving coil RC are arranged so that normally there is no transfer of energy between the two wayside elements, and as a result, at this time with no energy supplied to the input of amplifier TAM1, the tube GT1 remains non-conducting and relay R1 remains released.

It will now be assumed that a vehicle-carried coil tuned to the first frequency or 70 kc. passes the wayside transmitting coil TC and the receiving coil RC, so that energy of the 70 kc. frequency is transferred between the transmitting coil and the receiving coil. Accordingly, 70 kc. energy is supplied to the input of amplifier TAM1, and the output of the amplifier appears across the resistor 68. This voltage will have a certain phase relationship with respect to the reference voltage induced in the secondary winding 66 of transformer T7. The parts are constructed and arranged and the phase shifting equipment is adjusted so that this signal voltage appearing across the resistor 68 is substantially in phase with the reference voltage induced in the secondary winding 66 of transformer T7. The parts are selected and arranged so that at this time the signal voltage is positive with respect to ground at the same instant of time that the reference voltage is of the polarity for which the asymmetric units are conductive. That is to say, the reference voltage and the signal voltage have a polarity or phase relationship such that the current due to the reference voltage flows from right to left through rectifier K1 and left to right through rectifier K2 on the half-cycles in which the signal voltage is of the proper polarity to cause current to flow through rectifier K1. On these half-cycles the two currents add and charge the condenser 76 so that its upper plate is positive with respect to its lower or grounded plate. Accordingly, the succeeding half-cycles of the signal voltage and the reference voltage, having polarities as described above, will cause a voltage to be built up on condenser 76 with a polarity such that the upper plate is positive with respect to ground. During the other half-cycles of the reference and signal voltages, the charge on the condenser 76 is prevented from leaking off, since rectifier K1 is poled in the opposite direction to that required for energy to flow from the condenser 76 and the polarity of the reference voltage is such that it opposes any current flow from the condenser through rectifier K2. When the positive voltage of the condenser 76 exceeds the value of the negative bias voltage on the grid 24, the tube GT1 is rendered conductive and the flow of current through the plate circuit of the tube picks up relay R1. When relay R1 picks up, its contact 42 establishes a circuit previously traced for supplying energy to the indication lamp D1, so that the destination of the approaching train is indicated at the station ST. When the train TN subsequently leaves the station ST and proceeds to its destination, the track relay TR is shunted and released due to the train occupying the track circuit adjacent the track switch TS. Release of relay TR causes its contact 29 to interrupt the circuit for supplying power to the anode circuit of the tube GT1, and, accordingly, the tube is deionized and restored to its non-conductive condition. An operator at the wayside station ST by operating the push button 31 to open the line circuit by which the tube GT1 is powered can also deionize the tube GT1 to restore it to its non-conductive condition.

When the train TN is scheduled for a second destination, its controller 47 is set to connect capacitor 48 to the coil VC and thus tune the coil to resonance at 50 kc. which is the frequency that has been assigned to the second destination. This time the train coil VC will cause a transfer of the 50 kc. energy between the wayside transmitting and receiving coils TC and RC when the train carried coil VC passes the recording point RP. The 50 kc. alternating voltage is supplied to the input of the tuned amplifier TAM2, and the energy is supplied through the discriminator circuit for the second frequency, which is arranged and operated in a manner similar to that previously described for the 70 kc. frequency, so that the tube GT2 is rendered conductive, and relay R2 is picked up. When relay R2 picks up, its front contact 44 establishes a circuit for lighting the destination lamp D2 at the station ST, to indicate the approach of a train scheduled for the second destination. As previously explained in connection with the apparatus for the 70 kc. frequency, the cancellation of the indication by the deionization of the tube GT2 may be accomplished by the track relay TR and the push button 31.

It is apparent that if there are additional destinations for the trains, the wayside apparatus reporting point RP can be provided with additional oscillators and additional receivers, connected to the wayside transmitting and receiving coils. Each of these additional oscillators and receivers would include circuits which would be proportioned to use frequencies which are assigned to the additional destinations. Each additional receiver at the reporting point would, in turn, control additional destination indicators at the wayside stations. When there are additional destinations for the trains, then the trains would be provided with additional capacitors and additional positions for the switch 47 so that the coil VC can be tuned to resonance at the frequency assigned to the additional destination.

In place of providing a single train coil made tunable to the different destination frequencies, a plurality of train coils could be provided, each permanently tuned to a given destination. In this case the coils would preferably be arranged so that they could be attached to a train like the well-known train markers, and while the train is being made up for a run, the proper destination coils would be attached to the train and would remain so attached throughout the run of the particular train involved.

With the apparatus arranged as shown in Fig. 1 and described above, it has been found that when a relatively large metal object, such as the side of a vehicle is in proximity to the wayside transmitting and receiving coils, the electromagnetic field produced by the transmitting coil induces eddy currents in the metal, which, in turn, induce energy in the receiving coil RC, so that energy is transferred from the transmitting to the receiving coil. Since each of the frequencies will be represented in the transfer of energy caused by these eddy currents, energy will be supplied to each of the tuned amplifiers connected to the receiving coil RC.

It has been found, however, that the phase relationship of the energy induced in the receiving coil RC due to the passage of a metal object does not have the same phase relationship to the energy supplied from the oscillator as the energy which is induced in the receiving coil by the passage of the tuned vehicle coil.

A feature of my invention is the utilization of this phase difference, or shift in the relative polarity of the voltage induced in the receiving coil RC, to determine if the energy induced therein is due to the presence of a tuned vehicle-carried coil or to the presence of a nearby metal object. I accomplish this result by comparing the phase of the output voltage of the tuned amplifiers with the phase of the oscillator voltage, at each frequency employed, and arranging the apparatus to be responsive when and only when the phase difference is that produced by the coupling of the transmitting and receiving coils by the tuned vehicle coil.

As previously described in connection with the operation of the equipment when a tuned vehicle coil passes the reporting point RP, the output of the tuned amplifier is compared with the energy supplied by the oscillator to the discriminator circuits, and when this voltage is such that the condenser 76 is charged so that its upper element is positive with respect to the lower element or ground, the associated gas tube will be fired to pick up the indication relay.

The operation of the apparatus when the transmitting coil and receiving coil are coupled as a result of the proximity of a metal object will now be described.

It will be assumed that a large metal object moves into proximity to the transmitting coil TC and receiving coil RC, such as might be occasioned by the passage of a vehicle having metal sides or floor. The magnetic field set up by the transmitting coil TC as a result of the energy supplied thereto from the oscillators OSC1 and OSC2 cause eddy currents to be set up in the metal, which, in turn, set up an electromagnetic field which induces energy in the receiving coil RC. This action is not selective with respect to frequency, so that energy of the two frequencies, namely, 70 and 50 kc. will be induced in the receiving coil RC and supplied to the respective tube amplifiers TAM1 and TAM2.

Since the receiving apparatus for the two different frequencies is identical, except for the tuning, the detailed operation of the apparatus associated with the relay R1 will be described, the operation of the apparatus associated with relay R2 being similar.

At this time the reference voltage induced to the secondary winding 66 of transformer T7 will be of the opposite polarity with respect to the signal voltage appearing across resistor 68 than is the case when the voltage results from the passage of a tuned train-carried coil, since as was previously pointed out, the phase shift of the induced energy is different when the transmitting and receiving coils are coupled by a train-carried coil than it is when they are coupled by a metallic object. That is, during the half-cycles in which the polarity of the signal voltage is such as to cause current to flow through rectifier K1 from right to left, the reference voltage in secondary winding 66 is such as to oppose the signal voltage, so that the condenser 76 does not receive the positive charging impulses as previously described. During the other half-cycles, in which the reference voltage is of such polarity that it will flow through the rectifiers K1 and K2, the polarity of the signal voltage is such that the current will flow from the grounded terminal of resistor 68, through condenser 76, and through rectifier K2 from left to right. Accordingly, the flow of current is such that the succeeding alternate half-cycles of the reference signal voltage cause the upper plate of condenser 76 to be negatively charged with respect to its lower or grounded plate. During the alternate half-cycles in which the condenser 76 is not being charged, the rectifier K2 prevents the flow of energy from the grounded plate to the upper plate of condenser 76 and the reference voltage opposes any flow of energy through rectifier K1. As a result, a negative voltage is built up on condenser 76. Since the grid of tube 24 is thus driven further in the negative direction, the tube GT1 cannot fire and pick up relay R1. In a similar manner the tube GT2 will be prevented from firing and picking up relay R2 at this time.

It will be apparent, therefore, that with the apparatus comprising my invention as shown in Fig. 1, the influence of metal objects on the transmitting and receiving coils is prevented from causing false operation of the indication relays and associated apparatus. An additional advantage resulting from the provision of the phase discriminator circuit, as shown in Fig. 1, is that a short time delay in the firing of the tubes is provided by requiring a positive charge to be built up on the condenser connected with the grid of the tube, until a voltage is acquired sufficient to overcome the negative bias voltage on the grid of the tube. Thus, momentary surges of the voltage supplied to the tube or momentary induced surges in the wayside coil RC will not cause the erroneous operation of the indication relay. The condenser 76 is selected so that the energy supplied thereto as the result of a momentary surge will be insufficient to charge the condenser to the firing point of the tube, but the energy supplied thereto during the period in which the wayside coil is unbalanced by a tuned vehicle-carried coil passing at the highest speed encountered will be sufficient to fire the tube.

In the type of phase discriminator herein shown and described, the reference voltage is made comparatively large with respect to the signal voltage, in order to secure proper operation. It is to be noted that my invention is not limited to the use of this particular type of phase discriminator, but that other well-known phase discriminator circuit networks may be employed if desired.

Figure 2:
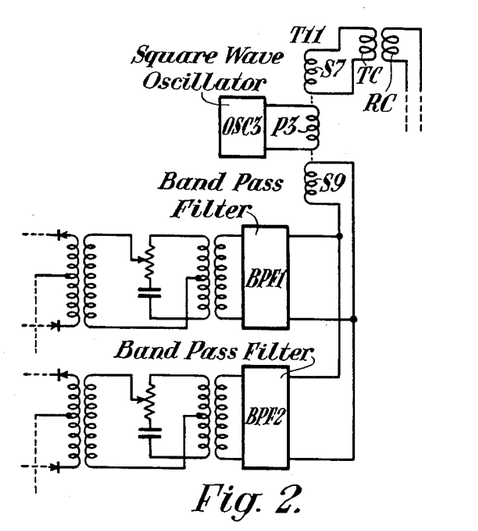
Figs. 2 and 3 are fragmentary views of the arrangement shown in Fig. 1, and employing different types of oscillators for supplying energy to the wayside elements.

In Fig. 2, the apparatus is similar to that shown in Fig. 1, except that the apparatus of Fig. 2 is modified to employ a single oscillator OSC3, the output energy of which has a square wave form. The oscillator OSC3 of Fig. 2 is shown conventionally since it may be any one of the several known constructions of electron tube oscillators, the output energy of which has a square wave form. The output of the oscillator OSC3 is connected to the primary winding P3 of the transformer T11, which transformer has a first secondary winding S7 connected to the transmitting coil TC, and a second secondary winding S9 which supplies energy to the phase discriminator circuits through band pass filters such as BPF1 and BPF2. The band pass filters are tuned to the frequency to which the receiving equipment is tuned.

It is known that a square wave has a composition showing odd harmonics of a fundamental frequency. Also, that these harmonic frequencies can be separated by applying the wave to circuits each of which is tuned to resonance at an individual harmonic frequency.

Accordingly, the tuned amplifiers, such as amplifiers TAM1 and TAM2, which would be connected through the receiving coil RC, would be tuned to one of the harmonic frequencies of the square wave supplied by the oscillator. The other tuned amplifier would be tuned to another harmonic frequency of the square wave oscillator, with the associated band pass filters tuned to the same frequencies. In this arrangement also, the vehicle-carried coil VC would be tuned to one of the harmonic frequencies of the square wave oscillator, so that when the vehicle-carried coil couples the wayside coils TC and RC, energy of one or the other harmonic frequencies is supplied to the tuned amplifier which is tuned to the same frequency. For example, the third harmonic frequency of the square wave supplied by oscillator OSC3 may be employed as one of the identification frequencies, associated with the band pass filter BPF1 and the corresponding tuned amplifier, and the fifth harmonic of the square wave supplied by oscillator OSC3 may be the identification frequency to which the band pass filter BPF2 and its associated tuned amplifier are tuned. Thus, when a vehicle-carried coil tuned to the third harmonic of the square wave frequency passes the wayside coils, the apparatus associated with the first band pass filter and tuned amplifier will be actuated, and when a vehicle-carried coil tuned to the fifth harmonic of the square wave frequency passes the reporting point, the apparatus associated with the second band pass filter and tuned amplifier would be actuated.

Figure 3:
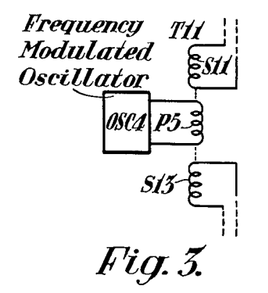

Fig. 3 shows a further modification of the apparatus as shown and described in Figs. 1 and 2, in which a frequency modulated oscillator is employed to supply a plurality of frequencies to the transmitting coil TC. The frequency modulated oscillator OSC4 is shown conventionally, since it may be constructed and arranged in any of the various manners well-known in the art, to provide a frequency which is shifted periodically from one value to another. The output of the frequency modulated oscillator is supplied to the wayside transmitting coil TC through the primary winding P5 and the secondary winding S11 of the transformer, while an additional secondary winding S13 supplies reference voltage to the discriminator circuits through band pass filters arranged as described in connection with Fig. 2. The apparatus would be constructed and arranged so that the frequencies supplied by the oscillator would periodically be varied to include the various frequencies to which the vehicle-carried coils and the tuned circuits in the receiving apparatus are tuned. Preferably the rate of frequency change of the oscillator OSC4 is sufficiently fast so that during the passage of a vehicle-carried coil tuned to a particular frequency, the oscillator will supply energy of that frequency for a time interval sufficiently long to cause actuation of the receiving circuits.

From the foregoing it will be apparent that my invention is not limited to use with any particular type of energy supplied for the various frequencies but may use several different arrangements, the necessary condition being that energy of the frequency to which the vehicle-carried coils and the wayside receiving equipment are tuned is supplied for an interval sufficiently long to cause actuation of the equipment.

Figure 4:
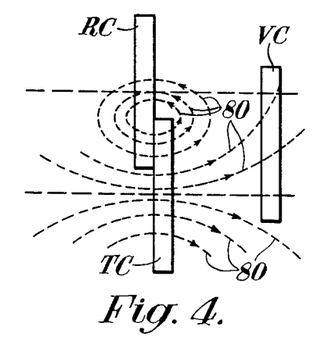
Figs. 4, 5, 6 and 7, illustrate the manner of mounting the wayside elements when these elements are induction coils, so as to normally prevent the transfer of energy between the coils.
Figure 5:
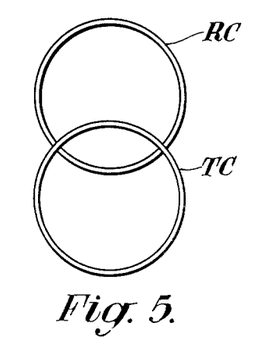

When the wayside transmitting and receiving coils TC and RC are mounted sufficiently close together to be coupled by the passage of a vehicle-carried coil, means must be provided for insuring that the normal coupling between the coils is insufficient to transfer energy effective to operate the receiving equipment, when no vehicle-carried coil is in the vicinity of the wayside coil. Several methods for accomplishing this desired result may be employed and will now be described. In Fig. 4 there is shown a diagrammatic illustration of one manner in which the wayside coils may be arranged so that the coupling between the coils is rendered insufficient to cause actuation of the receiving apparatus, by arranging the coils in parallel planes in such manner that the well-known "magic angle," or angle of zero coupling exists between a line drawn from the center of one coil to the center of the other coil and a line of intersection between the plane of one of the coils and a plane perpendicular to the planes of the coils and containing the centers of the coils. As shown, the transmitting coil and receiving coil are mounted in a substantially coplanar relationship and are overlapped by a predetermined amount, preferably 20% of the diameter of the coils. The vehicle-carried coil VC is shown in the position in which the maximum coupling would occur, which is at the time that the vehicle-carried coil is located so that its axis coincides with the center of the overlapped portions of the coils. This view is illustrative of that obtained by an observer parallel to the line of travel of the vehicle-carried coil. In Fig. 5 there is shown a diagrammatic view of the coils along their axis, showing how the transmitting coil and the receiving coil are overlapped. The overlapping of the coils causes a certain amount of the flux generated by the transmitting coil TC, indicated by the dotted lines 80, to circulate within the receiving coil without linking any of the turns of the coil. Accordingly, it will be seen that at the proper position the flux linkages between the transmitting coil and the receiving coil may be adjusted so that the turns of the receiving coil linked by flux in one direction are neutralized by the turns cut by the flux in the opposite direction, so that substantially no energy is induced in the receiving coil. The coils may be mounted in such manner that the amount of overlapping is adjustable, so that when the apparatus is installed, the coils may be adjusted to the point where a minimum normal coupling occurs. When the train-carried coil VC passes the wayside coils, the flux from the transmitting coil causes energy to be induced in the vehicle-carried coil, which in turn sets up flux which links the receiving coil and induces a voltage therein to thereby actuate the receiving equipment, as previously described.

The arrangement described above is the most preferable form, from the standpoint of economy and space, but it will be appreciated that the coils may be mounted in other arrangements which will produce the same effect, as long as the angle between a line connecting the centers of the coils and a line parallel to the plane of one of the coils is of a predetermined angle, known as the angle of zero coupling, and as long as the vehicle-carried coil links the two wayside coils by its passage.

Although the wayside transmitting and receiving coils may be mounted in any suitable position so long as the relationship shown by Fig. 4 is maintained with the vehicle-carried coil, a preferable arrangement is to mount the transmitting coil and the receiving coil vertically at one side of the route which the vehicle travels, in such manner that the vehicle-carried coil mounted vertically upon the side of the vehicle passes the transmitting and receiving coils in the relation shown by Fig. 4.

Figure 6:
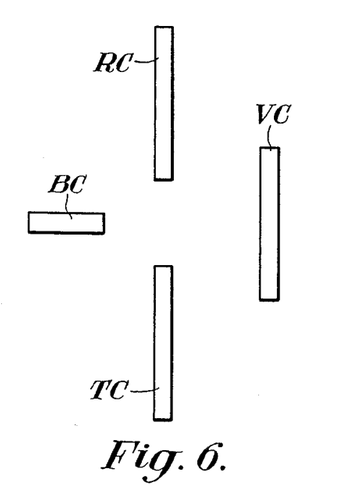
Figure 7:
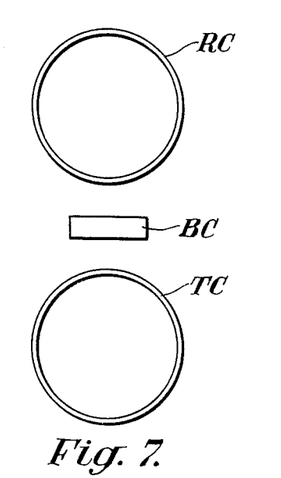

An alternative arrangement for the wayside transmitting and receiving coils is shown in Figs. 6 and 7. As here shown, the transmitting coil TC and receiving coil RC are mounted a short distance apart and in the same plane, and a neutralizing or bucking coil BC is mounted perpendicularly to the transmitting coils and receiving coils and a sufficient distance away from the plane of the transmitting and receiving coils to be unaffected by the passage of the vehicle-carried coil. The bucking coil BC and the receiving coil RC are electrically connected, so that the energy normally induced in the receiving coil RC by the magnetic field produced by the transmitting coil TC is effectively neutralized by the same magnetic field threading the turns of the bucking coil BC. The electrical connections of the bucking coil BC and the receiving coil RC may be arranged in several different manners as will now be described.

Figure 8:
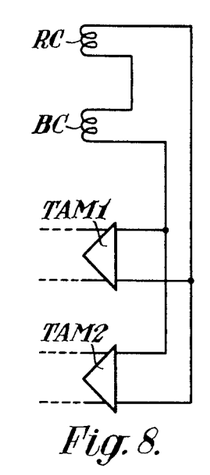
Figs. 8, 9 and 10, illustrate the manner in which the circuits of Fig. 1 should be modified when employing an arrangement of coils such as shown in Figs. 6 and 7.

In Fig. 8 the bucking coil BC and receiving coil RC are shown as being connected in series opposition, and with this arrangement the coil BC is arranged to be mechanically adjustable in its position so that the voltage induced therein will buck out or neutralize the voltage induced in the receiving coil RC, so that normally no energy is supplied to the input of the tuned amplifiers.

Figure 9:
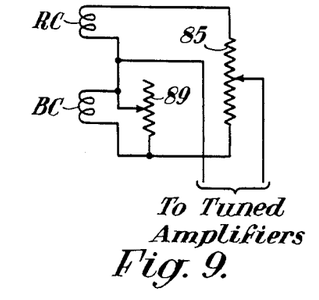

In Fig. 9 the receiving coil RC and the bucking coil BC are connected so that their voltages add, and the combined voltages are supplied to a potentiometer rheostat 85, so that a balance may be obtained for particular positions of the receiving and bucking coils with no vehicle-carried coil in the vicinity. An additional variable resistor 89 may be connected across the bucking coil BC, as shown, or may be connected across the receiving coil RC, to assist in this adjustment, and to also provide some degree of phase shift for obtaining the normal inactive condition of the apparatus.

Figure 10:
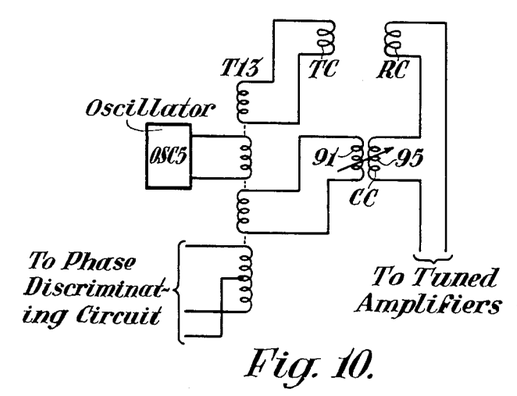

Fig. 10 shows a further modification in which the transmitting coil and the receiving coil are spaced apart, and voltage from the oscillator OSC5 is injected into the receiving circuit to balance out the voltage which is normally induced in the receiving coil RC by the field set up by the transmitting coil TC. As here shown, an additional secondary winding is provided on the transformer T13, over and above the secondary windings required for supplying energy to the transmitting coil and to the phase discriminator circuit, and this secondary winding is connected to the primary winding 91 of a transformer having a secondary winding 95, connected in series with the winding of the receiving coil RC. This coupling transformer designated by the reference character CC is constructed and arranged so that the coupling between the primary and secondary windings may be varied as indicated by the arrow through the windings. Accordingly, the voltage induced in the winding 95 may be so adjusted as to balance out the voltage which is induced in the receiving coil RC, when no train-carried coil is in the vicinity of the two wayside coils.

From the foregoing it will be obvious that any one of a plurality of arrangements may be employed to cancel the normal coupling between the transmitting and receiving coils, so that no energy will be supplied to the tuned amplifiers of the receiving circuits until a vehicle coil or a metal object approaches, and, as previously pointed out, the condition wherein a metal object causes voltage to be induced in the receiving coil is provided for by the use of the phase discriminator circuit described in connection with Fig. 1.

Figure 11:
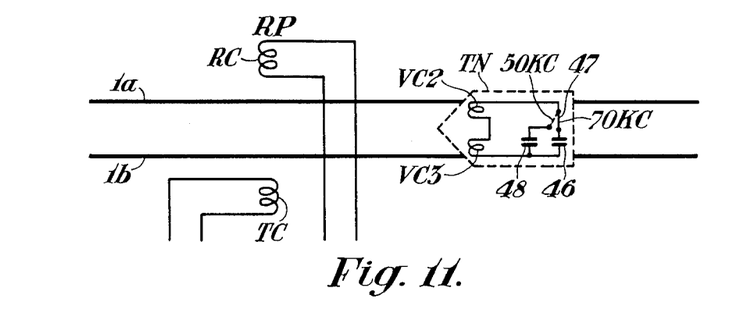
Fig. 11 shows the use of wayside coils as transmitting and receiving elements, which coils are located on opposite sides of the track, and which are coupled by two coils on the vehicle, connected by a tuned circuit.

Another arrangement for the wayside transmitting and receiving coils is shown in Fig. 11, wherein the transmitting coil and receiving coil are mounted so that the coils have the same axis but are on opposite sides of the track or route of the vehicle. In this modification separate vehicle coils are mounted on either side of the vehicle as indicated by the drawing. These coils, designated on the drawing as VC2 and VC3, are connected by a circuit including the capacitors 46 and 48 which may be selectively connected in series with the coils according to the position of the switch 47. The parts are proportioned and arranged so that when the switch 47 is in the position shown by the solid line, the coils and the condenser form a circuit which is resonant at 70 kc. or any one of the identification frequencies selected, and when the switch is in the other position, indicated by the dotted lines, the circuit including the vehicle-carried coils and the condenser 48 form a circuit tuned to the 50 kc. frequency. It will be seen that when the coils mounted on the vehicle pass the coils located on opposite sides of the track, energy from the transmitting coil TC induces energy in the vehicle-carried coil VC3 located on that side, and the current which flows in the circuit causes the vehicle coil VC2 located on the opposite side of the vehicle to set up an electromagnetic field which induces energy of the appropriate frequency in the receiving coil RC. The separation between the transmitting coil TC and the receiving coil RC, disposed on opposite sides of the track, is sufficient so that the coupling between the coils is so small that little or no voltage is induced in the receiving apparatus, except when a vehicle passes between the wayside coils. As pointed out beforehand in connection with Fig. 1, the presence of large metal objects in the vicinity of the coils is prevented from affecting the operation of the indication relay by action of the phase discriminator circuits which would be associated with the apparatus shown in Fig. 11.

It can be seen that the vehicle coils and their associated circuits may be provided with any suitable number of tuning condensers to tune the vehicle-carried equipment to the frequency corresponding to the destination of the vehicle. With the arrangement shown in Fig. 11, the spacing between the wayside coils reduces the coupling between them as pointed out above, and therefore makes it unnecessary to use any of the balancing arrangements described previously. However, this arrangement does require the use of coils located on the opposite side of the vehicle and connected by appropriate circuits, which may not be as preferable as the arrangement described beforehand where only a single vehicle-carried coil is required.

Although the arrangements hereinbefore described employed electromagnetic coupling between the vehicle and the wayside apparatus at the reporting point, my invention is not limited to such arrangements, but may employ electrostatic coupling. That is, the apparatus may be arranged so that the transfer of energy between the transmitting and receiving circuits at the wayside is accomplished by an electrostatic field which is set up when the vehicle passes the reporting point, rather than by an electromagnetic field.

Figures 12, 13:
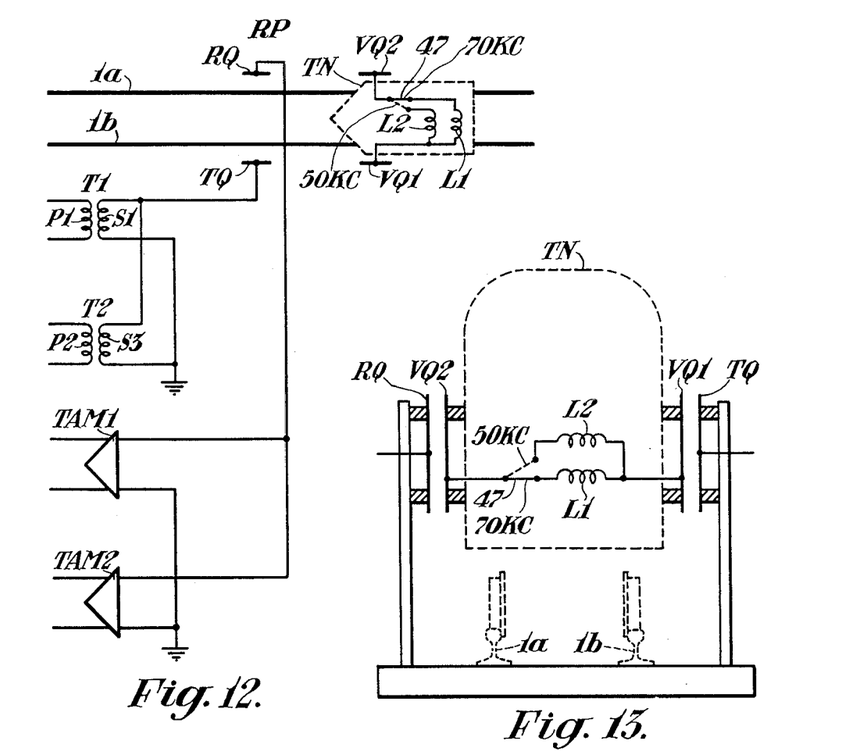
Figs. 12 and 13 show an arrangement in which metal plates attached to the sides of the vehicle act as plates of a condenser, to couple corresponding plates located along the wayside, which act as the transmitting and receiving elements of the system.

Fig. 12 shows a fragmentary view of an arrangement wherein electrostatic coupling is employed to provide a vehicle reporting system in accordance with my invention. In this arrangement a metal plate is located on either side of the track rails at the reporting point and is suitably insulated. One of the plates, such as the plate designated by the reference character TQ is connected to the transformers associated with the oscillators, so that the output energy from the oscillators is effectively supplied to the plate and to a grounding circuit indicated by the ground connection connected in multiple to the other terminals of the secondary windings of the output transformers. A second plate designated as RQ is located on the same axis as the first plate on the opposite side of the rails, and is connected to the input circuit of the tuned amplifiers TAM1 and TAM2. Each vehicle is provided with similar plates located on opposite sides of the vehicle and insulated from the body of the vehicle, such as the plates VQ1 and VQ2 shown in the drawing. These plates are connected together by a circuit including the selecting switch 47 which selectively connects the plates together through a first reactor L1 or a second reactor L2. When the switch is in its first position, the parts are proportioned and arranged so that the capacitance resulting from the proximity of the metal plates carried by the vehicle and the wayside plates together with the inductance of the reactor which happens to be connected in the circuit at that time form a resonant circuit at one of the frequencies employed for identification, such as, for example, 70 kc. when the switch is in the position shown, and 50 kc. when the switch is in the position shown by the dotted lines. It will be apparent that when the vehicle moves by the reporting point the energy is transferred through the circuit including the wayside plate TQ and the vehicle plate VQ1, forming one condenser element, through one or the other of the reactors L1 or L2 depending upon the position of the switch, and through the condenser element formed by the second plate VQ2 carried on the vehicle and the other wayside plate RQ, to the input of the tuned amplifiers TAM1 and TAM2. Accordingly, energy supplied from the oscillators is supplied to the receivers through the capacity coupled circuit described.

Fig. 13 is a cross sectional view showing the manner in which the wayside metallic plates and the plates mounted upon the vehicle may be arranged. It will be seen that the wayside plates are mounted on suitable supports, and provided with proper insulation, as are the plates located on the vehicle, which are supported from the sides of the vehicle by suitable insulation. The vehicle plates are shown as being connected together by the circuit including the reactors L1 and L2, as selected by a selecting switch 47. The oscillators and the apparatus associated with the receiving circuits may be arranged as shown in Fig. 1, since the action of this portion of the apparatus remains the same whether the inductive coupling or the capacitive coupling is employed.

From the foregoing it will be seen that my invention provides a vehicle reporting system in which separate wayside transmitting and receiving circuits are provided, the apparatus being arranged so that the circuits are normally inoperative, due to the absence of sufficient coupling between the wayside transmitting and receiving elements, and is rendered operative by the passage of a vehicle-carried element tuned to a frequency corresponding to the destination, class or route of the vehicle.

Although I have herein shown and described several forms of vehicle reporting systems embodying my invention, it is understood that various changes and modifications may be made therein within the scope of the appended claims without departing from the spirit and scope of my invention.

Having thus described my invention, what I claim is:

1. In a vehicle reporting system for reporting the passage of vehicles having different destinations, which vehicles traverse a common route for a portion of their travel, in combination, a vehicle-carried element mounted on each of said vehicles and comprising a single circuit capable of being tuned to electrical resonance for a plurality of frequencies in a predetermined frequency range, each frequency corresponding to a particular destination, a wayside transmitting element and a wayside receiving element located at a point along the common route of said vehicles, said wayside transmitting and receiving elements being geometrically arranged so that substantially no energy is normally induced in the receiving element and adapted to be coupled for the transfer of electrical energy in one manner when one of said vehicle-carried elements passes the point at which said wayside elements are located, and to be coupled for the transfer of electrical energy in another manner by the presence of metallic objects other than said vehicle-carried elements in the vicinity of said wayside elements, means for supplying alternating current energy having a plurality of frequency components within said predetermined range to said transmitting element, said frequency components corresponding to the different resonant frequencies of said vehicle-carried circuits, a plurality of tuned receivers connected to said wayside receiving element, one for each of the resonant frequencies of said vehicle-carried circuits, the energy supplied to said receivers having a first phase relationship to the voltage of said source when said energy is transferred from said transmitting element to said receiving element in said one manner and having a second phase relationship to the voltage of said source when said energy is transferred from said transmitting element to said receiving element in said another manner, discriminator means for each of said tuned receivers for determining the phase relationship of the voltage of the energy supplied thereto from said receiving element to the voltage of said source, and indicator means governed by said discriminator means and rendered effective only when energy having said first phase relationship is supplied from said receiving element to said tuned receivers.

2. In a vehicle reporting system for reporting the passage of vehicles having different destinations, which vehicles traverse a common route for a portion of their travel, in combination, a single vehicle-carried coil mounted on each of said vehicles and included in a circuit capable of being tuned to electrical resonance for a plurality of frequencies in a predetermined frequency range, each frequency corresponding to a particular destination, a wayside transmitting coil and a wayside receiving coil located at a point along the common route of said vehicles, said wayside transmitting and receiving coils being relatively positioned so that normally there is no transfer of energy between said wayside coils and adapted to be coupled for the transfer of electrical energy in one manner when one of said vehicle-carried coils passes the point at which said wayside coils are located, and to be coupled for the transfer of electrical energy in another manner by the presence of metallic objects other than said vehicle-carried coils in the vicinity of said wayside coils, means for supplying alternating current energy having a plurality of frequency components within said predetermined range to said transmitting coil, said frequency components corresponding to the different resonant frequencies of coil vehicle-carried circuits, a plurality of tuned receivers connected to said wayside receiving coil, one for each of the resonant frequencies of said vehicle-carried circuits, the energy supplied to said receivers having a first phase relationship to the voltage of said source when said energy is transferred from said transmitting coil to said receiving coil in said one manner and having a second phase relationship to the voltage of said source when said energy is transferred from said transmitting coil to said receiving coil in said another manner, discriminator means for each of said tuned receivers for determining the phase relationship of the voltage of the energy supplied thereto from said receiving coil to the voltages of said source, and indicator means governed by each of said tuned receivers and said discriminator means and rendered effective only when energy having said first phase relationship is supplied from said receiving coil to said tuned receivers.

3. In a vehicle reporting system, a vehicle-carried coil tuned to resonance at a given frequency, a wayside transmitting coil, means for supplying energy of said given frequency to said transmitting coil, a wayside receiving coil overlapping said transmitting coil by an amount sufficient to cancel the mutual inductance of said coils and disposed to have energy of said given frequency induced therein when coupled to said transmitting coil by the passage of said receiving coil or by the presence of metallic objects other than said vehicle-carried coil in the vicinity of said receiving coil, the energy induced in said receiving coil having a first phase relationship to the voltage of the energy supplied to said transmitting coil when the receiving coil is coupled to the transmitting coil by the presence of a vehicle-carried coil, and having a second phase relationship to the voltage of the energy supplied to said transmitting coil when the receiving coil is coupled to the transmitting coil by the presence of a metallic object other than said vehicle-carried coil, a normally inactive wayside receiver means tuned to said given frequency and connected to said wayside receiving coil, said receiver means being rendered active when said receiving coil is coupled to said transmitting coil by said vehicle-carried coil or a metallic object other than said receiving coil, an indicating means connected to said receiver means, and means associated with said receiver means for comparing the phase relationship of the voltage of the energy in said transmitting coil and said receiving coil and effective to enable the receiver means to actuate said indicating means when and only when said first phase relationship exists.

4. In a vehicle reporting system, a single vehicle-carried coil tuned to resonance at a given frequency, a wayside transmitting coil, means for supplying energy of said given frequency to said transmitting coil, a wayside receiving coil disposed adjacent said transmitting coil and positioned so that normally no energy is transferred between the coils, said coils being located to have energy of said given frequency induced in said receiving coil when coupled to said transmitting coil by the passage of said receiving coil or by the presence of metallic objects other than said vehicle-carried coil in the vicinity of said receiving coil, the energy induced in said receiving coil having a first phase relationship to the voltage of the energy supplied to said transmitting coil when the receiving coil is coupled to the transmitting coil by the presence of a vehicle-carried coil, and having a second phase relationship to the voltage of the energy supplied to said transmitting coil when the receiving coil is coupled to the transmitting coil by the presence of a metallic object other than said vehicle-carried coil, a normally inactive wayside receiver means tuned to said given frequency and connected to said wayside coil, said receiver means being rendered active when said receiving coil is coupled to said transmitting coil by said vehicle-carried coil or a metallic object other than said receiving coil, an indicating means connected to said receiver means, and means associated with said receiver means for comparing the phase relationship of the voltages of the energy in said transmitting coil and said receiving coil and effective to prevent said receiver means from actuating said indicating means except when said first phase relationship exists.

5. In a vehicle reporting system for reporting the passage of vehicles having different destinations, which vehicles traverse a common route for a portion of their travel, in combination, a vehicle-carried coil mounted on each of said vehicles and comprising a single circuit capable of being tuned to electrical resonance for a plurality of frequencies in a predetermined frequency range, each frequency corresponding to a particular destination, a wayside transmitting coil and a wayside receiving coil located at a common point along the common route of said vehicles, said wayside coils being relatively positioned to normally transfer no energy to said receiving coil and positioned with respect to said common route to be inductively coupled with each other by said vehicle-carried coil or other metallic objects in the vicinity of said wayside coils, a source of alternating current energy having a plurality of frequency components within said predetermined range corresponding to the different resonant frequencies of said vehicle-carried coils, means for supplying energy from said source to said transmitting coil, a plurality of tuned amplifiers, one for each of the resonant frequencies of said vehicle-carried coils, each of said tuned amplifiers being connected to said receiving coil to be supplied with energy therefrom when said transmitting and receiving coils are inductively coupled by the presence of a vehicle-carried coil or a metallic object in the vicinity of said wayside coils, the energy supplied to said tuned circuits having a first phase relationship to the voltage of said source when said wayside coils are coupled by the vehicle-carried coil and having a second phase relationship to the voltage of said source when said wayside coils are coupled by a metallic object other than said vehicle-carried coil, discriminator means for each of said tuned amplifiers for determining the phase relationship of the voltage of the energy supplied thereto to the voltage of said source, and indicator means governed by each of said tuned amplifiers and said discriminator means and rendered effective only when energy having said first phase relationship is supplied to said discriminator means.

6. In a vehicle reporting system for reporting the passage of vehicles having different destinations, which vehicles traverse a common route for a portion of their travel, in combination, a vehicle-carried coil mounted on each of said vehicles and capable of being tuned to electrical resonance for a plurality of frequencies in a predetermined frequency range, each frequency corresponding to a particular destination, a wayside transmitting coil and a wayside receiving coil located at a point along the common route of said vehicles, said wayside coils being relatively positioned to be inductively coupled with each other for the effective transfer of energy between said transmitting coil and said receiving coil only when said vehicle-carried coil or a metallic object other than said vehicle-carried coil is adjacent said wayside coils, a source of alternating current energy having a plurality of frequency components within said predetermined range corresponding to the different resonant frequencies of said vehicle-carried coils, means for supplying energy from said source to said transmitting coil, a plurality of tuned amplifiers connected to said receiving coil, one for each of the resonant frequencies of said vehicle-carried coils, the energy supplied to said tuned amplifiers having a first phase relationship to the voltage of said source when the wayside coils are coupled by a vehicle-carried coil and having a second phase relationship to the voltage of said source when said wayside coils are coupled by a metallic object other than a vehicle-carried coil, discriminator means connected to each of said tuned amplifiers and to said source for comparing the phase relationship of the voltage of the energy supplied thereto from said tuned amplifier and said source, and indicator means governed by said discriminator means rendered effective when and only when energy having said first phase relationship is supplied to the tuned amplifier from said receiving coil.

7. In a vehicle reporting system for reporting the passage of vehicles having a particular destination at a predetermined point on a common route which the vehicles traverse, in combination, a vehicle-carried coil mounted on each of said vehicles and tuned to electrical resonance at a frequency corresponding to the destination of the vehicle, a wayside transmitting coil and a wayside receiving coil located at said predetermined point, said wayside coils being mounted in substantially coplanar relation and being overlapped by an amount sufficient to cancel the normal mutual induction of the coils, to permit the effective transfer of energy therebetween only when said vehicle-carried coil or a metallic object other than said vehicle-carried coil is adjacent said point, said vehicle-carried coil being disposed to have its axis colinear with the axis of the overlapped portion of the wayside coils when passing said wayside coils, a source of alternating current energy having a frequency corresponding to the resonant frequency of said vehicle-carried coils, means for supplying energy from said source to said transmitting coil, a tuned amplifier having its input connected to said receiving coil and tuned to the frequency of said vehicle-carried coils, an output circuit for said tuned amplifier, the voltage of the energy supplied to said output circuit having a first phase relationship to the voltage of said source when said wayside coils are coupled by a vehicle-carried coil and having a second phase relationship to the voltage of said source when said wayside coils are coupled by a metallic object other than said vehicle-carried coils, discriminator means connected to said source and said output circuit for comparing the phase relationship of the energy supplied thereto from said source and said output circuit, and indicator means governed by said discriminator means and rendered effective when and only when energy having said first phase relationship with the voltage of said source is supplied to the discriminator means from said output circuit.

8. In a vehicle reporting system for reporting the passage of vehicles having a particular destination at a predetermined point on a common route which the vehicles traverse, in combination, a vehicle-carried coil mounted on each of said vehicles and tuned to electrical resonance at a frequency corresponding to the destination of the vehicle, a wayside transmitting coil and a wayside receiving coil located at said predetermined point, said wayside coils being disposed and arranged to be inductively coupled with each other for the effective transfer of energy between said transmitting and said receiving coils only when said vehicle-carried coil or a metallic object other than said vehicle-carried coil is in the vicinity of said wayside coils, a source of alternating current energy having a frequency corresponding to the resonant frequency of said vehicle-carried coils, means for supplying energy from said source to said transmitting coil, a tuned amplifier having its input connected to said receiving coil and tuned to the frequency of said vehicle-carried coils, an output circuit for said tuned amplifier, the voltage of the energy supplied to said output circuit having a first phase relationship to the voltage of said source when said wayside coils are coupled by a vehicle-carried coil and having a second phase relationship to the voltage of said source when said wayside coils are coupled by a metallic object other than said vehicle-carried coils, discriminator means connected to said source and said output circuit for comparing the phase relationship of the energy supplied thereto from said source and said output circuit, and indicator mean governed by said discriminator means and rendered inoperative except when energy having said first phase relationship with the voltage of said source is supplied to the discriminator means from said output circuit.

9. In a vehicle reporting system, a vehicle-carried coil tuned to resonance at a given frequency, a wayside transmitting coil, means for supplying energy to said wayside transmitting coil, a wayside receiving coil mounted adjacent said transmitting coil and positioned with respect to said transmitting coil so that normally no energy is induced in said receiving coil and located at a point to be inductively coupled to said transmitting coil by said vehicle-carried coil when the vehicle passes said point, normally inactive receiver means connected to said receiving coil and tuned to said given frequency, and indicator means connected to said receiver means.

10. In combination, a wayside transmitting coil, a source of alternating current energy having a predetermined frequency, means for supplying energy from said source to said transmitting coil, a vehicle-carried coil tuned to resonance at said predetermined frequency, single wayside receiving coil located adjacent said transmitting coil and positioned so that energy is induced therein from said transmitting coil only when coupled thereto by said vehicle-carried coil or a metallic object other than said vehicle-carried coil, the voltage of the energy induced in said receiving coil having a first phase relationship with the voltage of said source when said wayside coils are coupled by a vehicle-carried coil and having a second phase relationship with the voltage of said source when the wayside coils are coupled by a metallic object other than said vehicle-carried coil, an amplifier having an input circuit and an output circuit and tuned to respond only to energy of said predetermined frequency, said input circuit being connected to said receiving coil, a phase discriminator circuit network having an input winding coupled to said source and the output circuit of said amplifier, and having an output capacitor which is so connected to the input winding through a resistance and a pair of rectifying elements that it becomes charged by rectified voltage having a relative polarity determined by the phase relationship between the voltages of said source and the voltage induced in said receiving coil, a gas tube having an anode, a cathode, and a control grid, an anode-cathode circuit for said tube normally ineffective to fire the tube, said control grid being so connected to said capacitor that the grid is driven positive with respect to the cathode and the tube is fired when and only when said first phase relationship exists between the voltage of said source and the voltage induced in said receiving coil, and indication means controlled by said anode-cathode circuit.

11. In combination, a wayside transmitting coil, a source of alternating current energy having a predetermined frequency, means for supplying energy from said source to said transmitting coil, a vehicle-carried coil tuned to resonance at said predetermined frequency, a single wayside receiving coil positioned with respect to said transmitting coil so that energy is induced therein from said transmitting coil only when coupled thereto by said vehicle-carried coil or a metallic object other than said vehicle carried coil, the voltage of the energy induced in said receiving coil having a first phase relationship with the voltage of said source when said wayside coils are coupled by a vehicle-carried coil and having a second phase relationship with the voltage of said source when the wayside coils are coupled by a metallic object other than said vehicle-carried coil, an amplifier having an input circuit and an output circuit and tuned to respond only to energy of said predetermined frequency, said input circuit being connected to said receiving coil, a phase discriminator circuit network having an input winding coupled to said source and the output circuit of said amplifier, and having an output capacitor which is so connected to the input winding through a resistance and a pair of rectifying elements that it becomes charged by rectified voltage having a relative polarity determined by the phase relationship between the voltages of said source and the voltage induced in said receiving coil, a gas tube having an anode, a cathode, and a control grid, an anode-cathode circuit for said tube normally ineffective to fire the tube, biasing means for normally maintaining the grid of the tube at a predetermined negative potential to prevent said tube from firing, said control grid being so connected to said capacitor that the grid is driven further negative with respect to the cathode when said second phase relationship exists between the voltage of said source and the voltage induced in said receiving coil, and the grid is driven positive sufficiently to overcome the normal bias and fire the tube when and only when said first phase relationship exists between the voltage of said source and the voltage induced in said receiving coil, and indicator means governed by said anode cathode circuit.

12. In combination, a wayside transmitting coil, a source of alternating current energy having a predetermined frequency, means for supplying energy from said source to said transmitting coil, a vehicle-carried coil tuned to resonance at said predetermined frequency, a wayside receiving coil overlapping said transmitting coil a predetermined amount to have energy induced therein from said transmitting coil only when coupled thereto by said vehicle-carried coil or a metallic object other than said vehicle-carried coil, the voltage of the energy induced in said receiving coil having a first phase relationship with the voltage of said source when said wayside coils are coupled by a vehicle-carried coil and having a second phase relationship with the voltage of said source when the wayside coils are coupled by a metallic object other than said vehicle-carried coil, an amplifier having an input circuit and an output circuit and tuned to respond only to energy of said predetermined frequency, said input circuit being connected to said receiving coil, a phase discriminator circuit network having an input winding coupled to said source and the output circuit of said amplifier, and having an output capacitor which is so connected to the input winding through a resistance and a pair of rectifying elements that it becomes charged by rectified voltage having a relative polarity determined by the phase relationship between the voltage of said source and the voltage induced in said receiving coil, and indicator means governed by the voltage on said capacitor and effectively energized when and only when the capacitor voltage is of the polarity corresponding to that created when said first phase relationship exists between the voltage of said source and the voltage induced in said receiving coil.

13. In a vehicle reporting system for reporting the passage of vehicles having different destinations, which vehicles traverse a common route for a portion of their travel, in combination, a wayside transmitting coil, means for supplying energy having a plurality of frequency components to said transmitting coil comprising an oscillator having an output voltage which has substantially a square wave-shape providing harmonic frequencies of relatively large magnitude, a single wayside receiving coil disposed adjacent and overlapping said transmitting coil to prevent direct coupling therewith, receiver means connected to said receiving element, said receiver means being selectively responsive to energy at said harmonic frequencies, indicator means governed by said receiver means, and means for transferring energy at one of said harmonic frequencies from said transmitting to said receiving coil comprising a vehicle-carried impedance element and a circuit tuned to resonance at one of said harmonic frequencies and including said vehicle-carried element.

14. In a vehicle reporting system for reporting the passage of vehicles having different destinations, which vehicles traverse a common route for a portion of their travel, in combination, a vehicle-carried coil mounted on each of said vehicles and capable of being tuned to electrical resonance for a plurality of frequencies in a predetermined frequency range, each frequency corresponding to a particular destination, a wayside transmitting coil and a single wayside receiving coil located at a point along the common route of said vehicles, said wayside coils being geometrically arranged so that substantially no energy is normally induced in the receiving coil and adapted to be inductively coupled with each other for the effective transfer of energy between said transmitting coil and said receiving coil only when said vehicle-carried coil or a metallic object other than said vehicle-carried coil is adjacent the point at which said wayside coils are located, a source of alternating current energy having a plurality of prominent harmonic frequencies corresponding to the frequencies for which said vehicle-carried coils are tuned, means for supplying energy from said source to said transmitting coil, a plurality of tuned amplifiers connected to said receiving coil, one for each of the resonant frequencies of said vehicle-carried coils, the energy supplied to said tuned amplifiers having a first phase relationship to the voltage of said source when said wayside coils are coupled by a vehicle-carried coil and having a second phase relationship to the voltage of said source when said wayside coils are coupled by a metallic object other than a vehicle-carried coil, a plurality of discriminator means one connected to each of said tuned amplifiers, means for supplying energy from said source to one of said discriminator means at the harmonic frequency for which the tuned amplifier associated therewith is tuned, said discriminator means being constructed and arranged to compare the phase relationship of the voltages supplied thereto from said source and the tuned amplifier, and indicator means governed by said discriminator means and rendered active when and only when energy having said first phase relationship is supplied to the tuned amplifier from said receiving coil.

15. In a vehicle reporting system for reporting the passage of vehicles having different destinations, which vehicles traverse a common route for a portion of their travel, in combination, a vehicle-carried coil mounted on each of said vehicles and capable of being tuned to electrical resonance for a plurality of frequencies in a predetermined frequency range, each frequency corresponding to a particular destination, a wayside transmitting coil and a single wayside receiving coil located at a point along the common route of said vehicles, said wayside coils being geometrically arranged so that substantially no energy is normally induced in the receiving coil and adapted to be inductively coupled with each other for the effective transfer of energy between said transmitting coil and said receiving coil only when said vehicle-carried coil or a metallic object other than said vehicle-carried coil is adjacent the point at which said wayside coils are located, a source of alternating current energy having a plurality of prominent harmonic frequencies corresponding to the frequencies for which said vehicle-carried coils are tuned, means for supplying energy from said source to said transmitting coil, a plurality of tuned amplifiers connected to said receiving coil, one for each of the resonant frequencies of said vehicle-carried coils, the energy supplied to said tuned amplifiers having a first phase relationship to the voltage of said source when said wayside coils are coupled by a vehicle-carried coil and having a second phase relationship to the voltage of said source when said wayside coils are coupled by a metallic object other than a vehicle-carried coil, a plurality of discriminator means one connected to each of said tuned amplifiers, means for supplying energy from said source to one of said discriminator means at the harmonic frequency for which the tuned amplifier associated therewith is tuned, said discriminator means being constructed and arranged to compare the phase relationship of the voltages supplied thereto from said source and the tuned amplifier, and indicator means governed by said discriminator means and rendered inactive except when energy having said first phase relationship is supplied to the tuned amplifier from said receiving coil.

16. In a vehicle reporting system for reporting the passage of vehicles having different destinations, which vehicles traverse a common route for a portion of their travel, in combination, a vehicle-carried coil mounted on each of said vehicles and capable of being tuned to electrical resonance for a plurality of frequencies in a predetermined frequency range, each frequency corresponding to a particular destination, a wayside transmitting coil and a wayside receiving coil located at a point along the common route of said vehicles, said wayside coils being geometrically arranged so that substantially no energy is normally induced in the receiving coil and adapted to be inductively coupled with each other for the effective transfer of energy between said transmitting coil and said receiving coil only when said vehicle-carried coil or a metallic object other than said vehicle-carried coil is adjacent the point at which said wayside coils are located, a source of alternating current energy having an output frequency which is recurrently changed to produce a band of frequencies within a predetermined range corresponding to the frequencies for which said vehicle-carried coils are tuned, means for supplying energy from said source to said transmitting coil, a plurality of tuned amplifiers connected to said receiving coil, one for each of the resonant frequencies of said vehicle-carried coils, the energy supplied to said tuned amplifiers having a first phase relationship to the voltage of said source when said wayside coils are coupled by a vehicle-carried coil and having a second phase relationship to the voltage of said source when said wayside coils are coupled by a metallic object other than a vehicle-carried coil, a plurality of discriminator means one connected to each of said tuned amplifiers, means for supplying energy from said source to each of said discriminator means at the frequency to which the tuned amplifier associated with the discriminator means is tuned, said discriminator means being constructed and arranged to compare the phase relationship of the voltages supplied thereto from said source and said tuned amplifier, and indicator means governed by said discriminator means and rendered active when and only when energy having said first phase relationship is supplied to the tuned amplifier from said receiving coil.

17. In a vehicle reporting system, a wayside transmitting coil, and a wayside receiving coil, said wayside transmitting and receiving coils being mounted in substantially coplanar relation and being overlapped by an amount sufficient to cancel the normal mutual induction of the coils, and a vehicle-carried coil disposed to have its axis and the axis of the overlapped portions of the wayside coils in a colinear relation when said vehicle-carried coil passes said wayside coils.

18. In a vehicle reporting system, a wayside transmitting coil, a wayside receiving coil, and a vehicle-carried coil, said wayside transmitting and receiving coils being disposed in a substantially coplanar relation and being overlapped by approximately 20% of the diameter of the coils, said wayside coils and said vehicle-carried coil being disposed so that the axis of said vehicle-carried coil aligns with the center of the overlapped portions of the wayside coils at one time when said vehicle-carried coil passes said wayside coils.

19. In a vehicle reporting system, a wayside transmitting coil, a wayside receiving coil, and a vehicle-carried coil, said wayside transmitting coil and said wayside receiving coil being disposed in parallel planes so that a predetermined angle exists between the planes of the coils and a line drawn between the center of the coils to prevent electromagnetic coupling of the coils, said wayside coils and said vehicle-carried coil being disposed so that the vehicle-carried coil aligns with said wayside coils at one time when said vehicle-carried coil passes said wayside coils to thereby provide electromagnetic coupling between said wayside transmitting coil and said wayside receiving coil, an output device connected to said receiving coil, and indicator means connected to said output device for operation thereby.

20. In a vehicle reporting system, a wayside transmitting coil, a wayside receiving coil, and a vehicle-carried coil for inductively coupling said transmitting and receiving coils for the effective transfer of energy from said transmitting to said receiving coil when said vehicle-carried coil occupies a predetermined position with respect to said wayside coils, said wayside coils being arranged and disposed in an overlapping manner, whereby a portion of the flux produced by said transmitting coil links said receiving coil in a first manner and the remaining flux links said receiving coil in a second manner to produce a null coupling between said transmitting and receiving coils in the absence of said vehicle-carried coil.

(References on following page)

References Cited in the file of this patent

UNITED STATES PATENTS

| | | |
|---|---|---|
| 2,021,034 | Thompson | Nov. 12, 1935 |
| 2,320,150 | Loughridge | May 25, 1943 |
| 2,421,106 | Wight et al. | May 27, 1947 |
| 2,488,815 | Hailes | Nov. 22, 1949 |
| 2,492,388 | Martin | Dec. 27, 1949 |
| 2,597,517 | Noble | May 20, 1952 |
| 2,597,518 | Parks | May 20, 1952 |
| 2,673,292 | Treharne | Mar. 23, 1954 |
| 2,693,525 | Kendall | Nov. 2, 1954 |

FOREIGN PATENTS

| | | |
|---|---|---|
| 627,081 | Great Britain | July 27, 1949 |